US012769487B2

(12) United States Patent
Choi

(10) Patent No.: US 12,769,487 B2
(45) **Date of Patent: *Oct. 20, 2026**

(54) CONTROL CIRCUIT, MEMORY DEVICE INCLUDING THE SAME, AND METHOD

(71) Applicant: SK hynix Inc., Icheon-si (KR)

(72) Inventor: Won Ha Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,808

(22) Filed: Apr. 18, 2024

(65) Prior Publication Data

US 2024/0272836 A1 Aug. 15, 2024

Related U.S. Application Data

(60) Continuation of application No. 18/359,694, filed on Jul. 26, 2023, which is a division of application No. 16/889,244, filed on Jun. 1, 2020, now Pat. No. 11,755,255, which is a continuation-in-part of application No. 16/135,980, filed on Sep. 19, 2018, now Pat. No. 10,860,258, which is a continuation of (Continued)

(30) Foreign Application Priority Data

Dec. 24, 2015 (KR) ........................ 10-2015-0185948

(51) Int. Cl.
*G06F 3/06* (2006.01)
*G06F 11/10* (2006.01)

(52) U.S. Cl.
CPC .............. *G06F 3/068* (2013.01); *G06F 3/061* (2013.01); *G06F 3/0659* (2013.01); *G06F 11/1048* (2013.01)

(58) Field of Classification Search
None
See application file for complete search history.

(56) References Cited

U.S. PATENT DOCUMENTS

| | | | |
|---|---|---|---|
| 6,125,184 | A | 9/2000 | Dillon et al. |
| 6,366,506 | B1 | 4/2002 | Mizuno et al. |
| 6,633,926 | B1 | 10/2003 | Harada et al. |

(Continued)

FOREIGN PATENT DOCUMENTS

| | | |
|---|---|---|
| KR | 10-2004-0057374 | 7/2004 |
| KR | 20050100290 | 10/2005 |

(Continued)

OTHER PUBLICATIONS

U.S. Final Office Action dated Oct. 9, 2024 in U.S. Appl. No. 18/359,694.

(Continued)

*Primary Examiner* — Hosain T Alam
*Assistant Examiner* — Ryan Dare
(74) *Attorney, Agent, or Firm* — Weaver Austin Villeneuve & Sampson LLP

(57) ABSTRACT

A control circuit configured to associate a plurality of memory with an error correction scheme. The control circuit including an internal operation circuit configured to generate an internal command based on an access unit of the plurality of memory. The control circuit including a storage circuit configured to store information on the access unit of the plurality of memory.

21 Claims, 6 Drawing Sheets

Related U.S. Application Data application No. 15/165,214, filed on May 26, 2016, now Pat. No. 10,108,491.

(56) References Cited

U.S. PATENT DOCUMENTS

| | | | |
|---|---|---|---|
| 7,269,043 | B2 | 9/2007 | Lee |
| 7,606,987 | B2 | 10/2009 | Sawa et al. |
| 7,696,778 | B1 | 4/2010 | Sreeramaneni et al. |
| 8,117,396 | B1 | 2/2012 | Fair et al. |
| 8,225,006 | B1 | 7/2012 | Karamcheti |
| 8,417,873 | B1 | 4/2013 | Karamcheti et al. |
| 8,458,429 | B2 | 6/2013 | Dahan et al. |
| 8,732,384 | B1 | 5/2014 | Scharam et al. |
| 8,904,082 | B1 | 12/2014 | Brahmadathan et al. |
| 9,046,424 | B2 | 6/2015 | Hsu et al. |
| 9,716,497 | B2 | 7/2017 | Cho et al. |
| 9,727,258 | B1 | 8/2017 | Nazarian et al. |
| 9,760,494 | B2 | 9/2017 | Gschwind et al. |
| 9,786,389 | B2 | 10/2017 | Jung et al. |
| 9,852,089 | B2 | 12/2017 | Kang |
| 9,977,606 | B2 | 5/2018 | Kim et al. |
| 9,990,283 | B2 | 6/2018 | Lee et al. |
| 10,067,903 | B2 | 9/2018 | Kang |
| 10,075,165 | B2 | 9/2018 | Cho et al. |
| 10,108,491 | B2 | 10/2018 | Choi |
| 10,180,796 | B2 | 1/2019 | Kim et al. |
| 10,303,378 | B2 | 5/2019 | Kim |
| 10,445,003 | B2 | 10/2019 | Kim et al. |
| 10,453,541 | B1 | 10/2019 | Rowley et al. |
| 10,466,909 | B2 | 11/2019 | Kim et al. |
| 10,491,215 | B2 | 11/2019 | Cho et al. |
| 10,860,258 | B2 | 12/2020 | Choi |
| 10,897,253 | B2 | 1/2021 | Cho et al. |
| 11,016,545 | B2 | 5/2021 | Yang et al. |
| 11,036,396 | B2 | 6/2021 | Choi |
| 11,082,043 | B2 | 8/2021 | Choi et al. |
| 11,138,120 | B2 | 10/2021 | Lee et al. |
| 11,347,444 | B2 | 5/2022 | Choi |
| RE49,496 | E | 4/2023 | Kang |
| 11,755,255 | B2 | 9/2023 | Choi et al. |
| 2001/0014049 | A1 | 8/2001 | Woo et al. |
| 2002/0009082 | A1 | 1/2002 | Matsuoka et al. |
| 2002/0078408 | A1* | 6/2002 | Chambers ........ G11C 29/56004 714/718 |
| 2003/0079115 | A1 | 4/2003 | Henry et al. |
| 2004/0199730 | A1 | 10/2004 | Eggers et al. |
| 2004/0260957 | A1 | 12/2004 | Jeddeloh et al. |
| 2005/0034035 | A1* | 2/2005 | Jung ...................... H04N 9/888 386/E9.059 |
| 2005/0041655 | A1 | 2/2005 | Hughes |
| 2005/0044128 | A1 | 2/2005 | Scott et al. |
| 2005/0203972 | A1 | 9/2005 | Cochran et al. |
| 2005/0226080 | A1 | 10/2005 | Lee |
| 2006/0064546 | A1 | 3/2006 | Arita et al. |
| 2006/0151614 | A1 | 7/2006 | Nishizawa et al. |
| 2006/0179185 | A1 | 8/2006 | Daly et al. |
| 2007/0002668 | A1 | 1/2007 | Williams et al. |
| 2007/0005890 | A1 | 1/2007 | Gabel et al. |
| 2007/0013704 | A1 | 1/2007 | MacWilliams et al. |
| 2008/0074138 | A1 | 3/2008 | Lee |
| 2008/0082746 | A1 | 4/2008 | Nakamura |
| 2008/0082766 | A1 | 4/2008 | Okin et al. |
| 2008/0109595 | A1 | 5/2008 | Rajan et al. |
| 2008/0162980 | A1 | 7/2008 | Dahan et al. |
| 2008/0244227 | A1 | 10/2008 | Gee et al. |
| 2009/0063729 | A1* | 3/2009 | Gower ................ G06F 11/1048 710/35 |
| 2009/0094406 | A1 | 4/2009 | Ashwood |
| 2010/0001786 | A1 | 1/2010 | Ramachandran et al. |
| 2010/0005212 | A1 | 1/2010 | Gower et al. |
| 2010/0030980 | A1 | 2/2010 | Yamada et al. |
| 2010/0125693 | A1 | 5/2010 | Kim et al. |
| 2010/0214862 | A1 | 8/2010 | Kim et al. |
| 2011/0029696 | A1 | 2/2011 | Uehara |
| 2011/0035559 | A1 | 2/2011 | Asai et al. |
| 2011/0063022 | A1 | 3/2011 | Tom et al. |
| 2011/0066798 | A1 | 3/2011 | Kaiwa et al. |
| 2011/0102073 | A1 | 5/2011 | Riho |
| 2011/0153903 | A1 | 6/2011 | Hinkle et al. |
| 2011/0193590 | A1 | 8/2011 | Nakagawa |
| 2011/0208939 | A1 | 8/2011 | Takizawa |
| 2011/0227234 | A1 | 9/2011 | Nishizawa et al. |
| 2011/0242916 | A1 | 10/2011 | Seol et al. |
| 2011/0276845 | A1 | 11/2011 | Depew et al. |
| 2011/0320688 | A1* | 12/2011 | Lee ..................... G06F 12/0246 711/E12.008 |
| 2012/0095719 | A1 | 4/2012 | Araki et al. |
| 2012/0151098 | A1 | 6/2012 | Sullivan |
| 2012/0185633 | A1 | 7/2012 | Sano |
| 2012/0191964 | A1 | 7/2012 | Lee et al. |
| 2013/0013970 | A1 | 1/2013 | Tao et al. |
| 2013/0015880 | A1 | 1/2013 | Haraguchi |
| 2013/0054949 | A1 | 2/2013 | Berke et al. |
| 2013/0067136 | A1 | 3/2013 | Bates et al. |
| 2013/0080732 | A1 | 3/2013 | Nellans et al. |
| 2013/0083611 | A1 | 4/2013 | Ware et al. |
| 2013/0111299 | A1 | 5/2013 | Hashimoto et al. |
| 2013/0117503 | A1 | 5/2013 | Nellans et al. |
| 2013/0335114 | A1 | 12/2013 | Chen et al. |
| 2014/0047206 | A1* | 2/2014 | Ochiai .................... G06F 13/18 711/163 |
| 2014/0089264 | A1 | 3/2014 | Talagala et al. |
| 2014/0089265 | A1 | 3/2014 | Talagala et al. |
| 2014/0112370 | A1 | 4/2014 | Hsu et al. |
| 2014/0192606 | A1 | 7/2014 | Kang et al. |
| 2014/0268973 | A1 | 9/2014 | Connolly |
| 2014/0281119 | A1 | 9/2014 | Hyun et al. |
| 2014/0282198 | A1 | 9/2014 | Mayworm |
| 2014/0285141 | A1 | 9/2014 | Lee et al. |
| 2014/0344488 | A1 | 11/2014 | Flynn et al. |
| 2014/0372696 | A1 | 12/2014 | Tune et al. |
| 2014/0372698 | A1 | 12/2014 | Lee et al. |
| 2015/0006937 | A1 | 1/2015 | Rotem et al. |
| 2015/0008732 | A1 | 1/2015 | Fujimoto |
| 2015/0032965 | A1 | 1/2015 | Sugimoto et al. |
| 2015/0085594 | A1 | 3/2015 | Dong et al. |
| 2015/0117122 | A1 | 4/2015 | Lee et al. |
| 2015/0162911 | A1 | 6/2015 | Byeon |
| 2015/0186200 | A1 | 7/2015 | Chen |
| 2015/0186275 | A1 | 7/2015 | Moga et al. |
| 2015/0212879 | A1 | 7/2015 | Choi et al. |
| 2015/0248922 | A1 | 9/2015 | Hyun et al. |
| 2016/0003893 | A1 | 1/2016 | Ibrahimovic et al. |
| 2016/0048347 | A1 | 2/2016 | Rangarajan et al. |
| 2016/0204782 | A1 | 7/2016 | Lee et al. |
| 2016/0224247 | A1 | 8/2016 | Woo et al. |
| 2016/0267954 | A1 | 9/2016 | Sun et al. |
| 2016/0306922 | A1 | 10/2016 | van Rooyen et al. |
| 2017/0004040 | A1 | 1/2017 | Chinnakkonda Vidyapoornachary et al. |
| 2017/0031848 | A1 | 2/2017 | Kang |
| 2017/0040049 | A1 | 2/2017 | Arai et al. |
| 2017/0109043 | A1 | 4/2017 | Kim et al. |
| 2017/0109060 | A1 | 4/2017 | Kim et al. |
| 2017/0109061 | A1 | 4/2017 | Lee et al. |
| 2017/0109062 | A1 | 4/2017 | Kim et al. |
| 2017/0109063 | A1 | 4/2017 | Lee et al. |
| 2017/0109065 | A1 | 4/2017 | Kim et al. |
| 2017/0109066 | A1 | 4/2017 | Kim et al. |
| 2017/0109067 | A1 | 4/2017 | Kim et al. |
| 2017/0109070 | A1 | 4/2017 | Kim et al. |
| 2017/0109071 | A1 | 4/2017 | Kim et al. |
| 2017/0109072 | A1 | 4/2017 | Kim et al. |
| 2017/0109073 | A1 | 4/2017 | Kim et al. |
| 2017/0109074 | A1 | 4/2017 | Lee et al. |
| 2017/0109075 | A1 | 4/2017 | Lee et al. |
| 2017/0109076 | A1 | 4/2017 | Kim et al. |
| 2017/0109077 | A1 | 4/2017 | Lee et al. |
| 2017/0109086 | A1 | 4/2017 | Kim et al. |
| 2017/0109091 | A1 | 4/2017 | Gans |
| 2017/0109274 | A1 | 4/2017 | Lee et al. |
| 2017/0109277 | A1 | 4/2017 | Kim et al. |

(56) References Cited

U.S. PATENT DOCUMENTS

| | | | |
|---|---|---|---|
| 2017/0110207 | A1 | 4/2017 | Jung et al. |
| 2017/0148417 | A1 | 5/2017 | Lee et al. |
| 2017/0185480 | A1 | 6/2017 | Choi |
| 2017/0249223 | A1 | 8/2017 | Sherlock et al. |
| 2017/0249247 | A1 | 8/2017 | Nishino et al. |
| 2017/0277603 | A1 | 9/2017 | Zhu et al. |
| 2017/0300239 | A1 | 10/2017 | Choi et al. |
| 2017/0300411 | A1 | 10/2017 | Choi et al. |
| 2017/0351450 | A1 | 12/2017 | Brandl et al. |
| 2017/0351451 | A1 | 12/2017 | Gans |
| 2018/0074989 | A1 | 3/2018 | Kang |
| 2019/0018736 | A1 | 1/2019 | Choi |
| 2020/0192804 | A1 | 6/2020 | Lee et al. |
| 2020/0293197 | A1 | 9/2020 | Choi et al. |
| 2020/0293199 | A1 | 9/2020 | Choi et al. |
| 2021/0011629 | A1 | 1/2021 | Choi |
| 2021/0262958 | A1 | 8/2021 | Shabbir |
| 2023/0367518 | A1 | 11/2023 | Choi et al. |
| 2023/0367519 | A1 | 11/2023 | Choi et al. |
| 2024/0264779 | A1 | 8/2024 | Cho et al. |

FOREIGN PATENT DOCUMENTS

| | | |
|---|---|---|
| KR | 10-2006-0038105 | 5/2006 |
| KR | 10-2009-0021743 | 3/2009 |
| KR | 10-2009-0065504 | 6/2009 |
| KR | 1020110013704 | 2/2011 |
| KR | 10-2011-0129149 | 12/2011 |
| KR | 10-2012-0079682 | 7/2012 |
| KR | 20130126321 | 11/2013 |
| KR | 10-2014-0064980 | 5/2014 |
| KR | 20140078261 | 6/2014 |
| KR | 10-1441154 | 9/2014 |
| KR | 10-2014-0124781 | 10/2014 |
| KR | 10-2014-0146469 | 12/2014 |
| KR | 20170014567 | 2/2017 |
| WO | 2005004047 | 1/2005 |
| WO | 2011106049 | 9/2011 |
| WO | 2012021380 | 2/2012 |

OTHER PUBLICATIONS

U.S. Non-Final Office Action dated Jul. 11, 2017 in U.S. Appl. No. 14/977,813.

U.S. Notice of Allowance dated Oct. 12, 2017 in U.S. Appl. No. 14/977,813.

U.S. Non-Final Office Action dated Jan. 8, 2018 in U.S. Appl. No. 15/165,214.

U.S. Notice of Allowance dated Jun. 26, 2018 in U.S. Appl. No. 15/165,214.

U.S. Non-Final Office Action dated Mar. 16, 2018 in U.S. Appl. No. 15/816,424.

U.S. Notice of Allowance dated Jun. 27, 2018 in U.S. Appl. No. 15/816,424.

U.S. Non-Final Office Action dated Mar. 20, 2020 in U.S. Appl. No. 16/135,980.

U.S. Notice of Allowance dated Jun. 26, 2020 in U.S. Appl. No. 16/135,980.

U.S. Non-Final Office Action dated Sep. 29, 2020 in U.S. Appl. No. 16/889,253.

KR Office Action dated Sep. 25, 2020 in Application No. KR10-2014-0147541.

U.S. Notice of Allowance dated Feb. 8, 2021 in U.S. Appl. No. 15/248,240.

U.S. Notice of Allowance dated Mar. 18, 2021 in U.S. Appl. No. 16/889,253.

U.S. Notice of Allowance dated May 28, 2021 in U.S. Appl. No. 16/889,253.

U.S. Non-Final Office Action dated Aug. 9, 2021 in U.S. Appl. No. 16/859,787.

U.S. Non-Final Office Action dated Oct. 4, 2021 in U.S. Appl. No. 16/889,249.

KR Office Action dated Aug. 19, 2021 in Application No. KR10-2015-0108192.

KR Office Action dated Aug. 26, 2021 in Application No. KR10-2015-0185948.

KR Notice of Allowance dated Nov. 4, 2021 in Application No. KR10-2015-0185948.

U.S. Non-Final Office Action dated Nov. 9, 2021 in U.S. Appl. No. 17/033,422.

U.S. Final Office Action dated Dec. 7, 2021 in U.S. Appl. No. 16/859,787.

U.S. Final Office Action dated Feb. 15, 2022 in U.S. Appl. No. 16/889,249.

U.S. Notice of Allowance dated Mar. 18, 2022 in U.S. Appl. No. 17/033,422.

U.S. Corrected Notice of Allowability dated Apr. 22, 2022 in U.S. Appl. No. 17/033,422.

KR Notice of Allowance dated Feb. 16, 2022 in Application No. KR10-2015-0108192.

U.S. Non-Final Office Action dated Aug. 31, 2022 in U.S. Appl. No. 16/859,787.

U.S. Non-Final Office Action dated Aug. 31, 2022 in U.S. Appl. No. 16/889,249.

KR Office Action dated Aug. 30, 2022 in Application No. KR10-2016-0047345.

U.S. Final Office Action dated Jan. 17, 2023 in U.S. Appl. No. 16/889,249.

U.S. Notice of Allowance dated Jan. 19, 2023 in U.S. Appl. No. 16/859,787.

U.S. Corrected Notice of Allowability dated Feb. 3, 2023 in U.S. Appl. No. 16/859,787.

U.S. Non-Final Office Action dated May 26, 2023 in U.S. Appl. No. 16/889,249.

U.S. Final Office Action dated Oct. 5, 2022 in U.S. Appl. No. 16/889,244.

U.S. Non-Final Office Action dated Jul. 15, 2022 in U.S. Appl. No. 16/889,244.

U.S. Non-Final Office Action dated Dec. 30, 2022 in U.S. Appl. No. 16/889,244.

U.S. Notice of Allowance dated Apr. 28, 2023 in U.S. Appl. No. 16/889,244.

U.S. Restriction Requirement dated Apr. 15, 2022 in U.S. Appl. No. 16/889,244.

U.S. Supplemental Notice of Allowability dated Jun. 16, 2023 in U.S. Appl. No. 16/889,244.

U.S. Non-Final Office Action dated Feb. 28, 2024 in U.S. Appl. No. 18/359,694.

U.S. Non-Final Office Action dated Apr. 23, 2024 in U.S. Appl. No. 18/359,700.

U.S. Appl. No. 18/639,810, filed Apr. 18, 2024, Cho et al.

JEDEC Standard No. 305, "DDR5 Load Reduced (LRDIMM) and Registered Dual Inline Memory Module (RDIMM) Common Specification"(JESD305), Jan. 2022, Section 5: Component Details (cont'd)/Table 9—DDR5 X4/X8 SDRAM DIMM Pad Array, Section 5.1: Component Types and Placement, p. 10.

JEDEC Standard No. 82-513, "DDR5 Registering Clock Driver Definition (DDR5RCD03)" (JESD82-513), Rev. 1.00, Mar. 2023, Section 3.1 (lines 1-3), p. 6.

MICRON® CCM005-1684161373-23, "DDR5 SDRAM," Rev. D, Oct. 2022 (Initial Release: June 2020), Table 25: MR4 Register and OP-Code Bit Definitions (MA[7:0] = 04h), pp. 58-59; Temperature Sensor, p. 168; $^t$REFI and $^t$RFC Parameters (lines 1-9), Table 175: $^t$REFI Parameters for REFab and REFsb Commands by Device Density (Including 3DS), pp. 175-176; Self Refresh Operation (lines 1-6), p. 182.

MICRON® CM005-802248454-6, "DDR5 SDRAM RDIMM Core,"Rev. G, May 2023 (Preliminary Release: June 2020), Product Description and Features, Table 1: DDR5 Product Family Attributes, pp. 1-2; SPD EEPROM Hub Operation (lines 1-4), Registering Clock Driver Operation, Power Management Integrated Circuit Operation, Table 6: PMIC Addressing, pp. 11-13; T85 Temperature

(56) References Cited

OTHER PUBLICATIONS

Sensor Operation, Table 7: DDR5 SDRAM Thermal Characteristics, DDR5 Module Capacitor Operating Temperature, pp. 15-16.
U.S. Final Office Action dated Feb. 6, 2025 in U.S. Appl. No. 18/359,700.
U.S. Non-Final Office Action dated Mar. 5, 2025 in U.S. Appl. No. 18/359,694.
U.S. Non-Final Office Action dated May 9, 2025 in U.S. Appl. No. 18/359,700.
U.S. Final Office Action dated Jun. 20, 2025 in U.S. Appl. No. 18/639,810.
U.S. Final Office Action dated Oct. 1, 2025 in U.S. Appl. No. 18/359,700.
U.S. Non-Final Office Action dated Jan. 26, 2026 in U.S. Appl. No. 18/359,700.
U.S. Final Office Action dated Oct. 21, 2025 in U.S. Appl. No. 18/359,694.
U.S. Non-Final Office Action dated Oct. 22, 2025 in U.S. Appl. No. 18/639,810.
U.S. Final Office Action dated Jul. 16, 2026 in U.S. Appl. No. 18/359,700.

* cited by examiner

CONTROL CIRCUIT, MEMORY DEVICE INCLUDING THE SAME, AND METHOD

CROSS-REFERENCES TO RELATED APPLICATION

The present application is a continuation of U.S. application Ser. No. 18/359,694 filed on Jul. 26, 2023, which is a division of U.S. application Ser. No. 16/889,244 filed on Jun. 1, 2020, which is a continuation-in-part of U.S. application Ser. No. 16/135,980 filed on Sep. 19, 2018, which is a continuation of U.S. application Ser. No. 15/165,214 filed on May 26, 2016, which claims priority under 35 U.S.C. § 119(a) to Korean Application No. 10-2015-0185948 filed on Dec. 24, 2015.

BACKGROUND

1. Technical Field

Various embodiments may generally relate to a control circuit, a memory device including the same, and method.

2. Related Art

Memory devices may include various types of memory. When various types of memory are included in one memory device, control schemes different from one another may be required in order to perform a read or write operation with respect to the various types of memory.

SUMMARY

In an embodiment, a control circuit may be provided. The control circuit may associate a plurality of memory with an error correction unit of a host. The control circuit may include an internal operation circuit configured to generate an internal command on a basis of an access unit of the plurality of memory. The control circuit may include a storage circuit configured to store information on the access unit of the plurality of memory.

In an embodiment, a memory device may be provided. The memory device may include a host configured to generate a command and operate according to a preset error correction scheme. The memory device may include a control circuit configured to generate an internal command from the received command on a basis of data of the host, a unit of an error correction code, and an access unit of the plurality of memory in order to associate the error correction scheme of the host. The plurality of memory may be configured to operate based on an internal command received from the control circuit.

A method of performing an operation with a control circuit. The method including generating a command based on an access unit of a plurality of memory.

DETAILED DESCRIPTION

In a control circuit and a memory device including the same according to various embodiments, it may be possible to perform different types of operation control on the basis of an access unit according to the types of memory.

In a control circuit and a memory device including the same according to various embodiments, new internal commands may be generated on the basis of an access unit decided according to the types of memory, so that it may be possible to control operations for a plurality of memory.

In a control circuit and a memory device including the same according to various embodiments, operations are controlled with respect to a plurality of memory on the basis of an access unit and data and error correction codes that are separately controlled, so that it may be possible to associate operations between a host using different error correction schemes and the plurality of memory with one another.

According to various embodiments, in the control circuit and the memory device including the same, it may be possible to control operations according to different access units of memories. Since the control circuit internally controls operations according to the various types of the memory, for example, since a host does not need to generate different commands according to the access unit of the memories, operation efficiency can be improved.

Furthermore, according to various embodiments, in the control circuit and the memory device including the same, even when an error correction unit of a host is different from error correction units of memories, operations may be controlled according to an access unit, so that it may be possible to allow data provided through different error correction schemes and error correction codes associated with the data to be compatible with each other. Consequently, data is written in a plurality of memory or data is read from the plurality of memory and an error correction operation is performed, so that operation reliability may be improved.

Hereinafter, a control circuit and a memory device including the same will be described below with reference to the accompanying drawings through various examples of embodiments.

Figure 1:
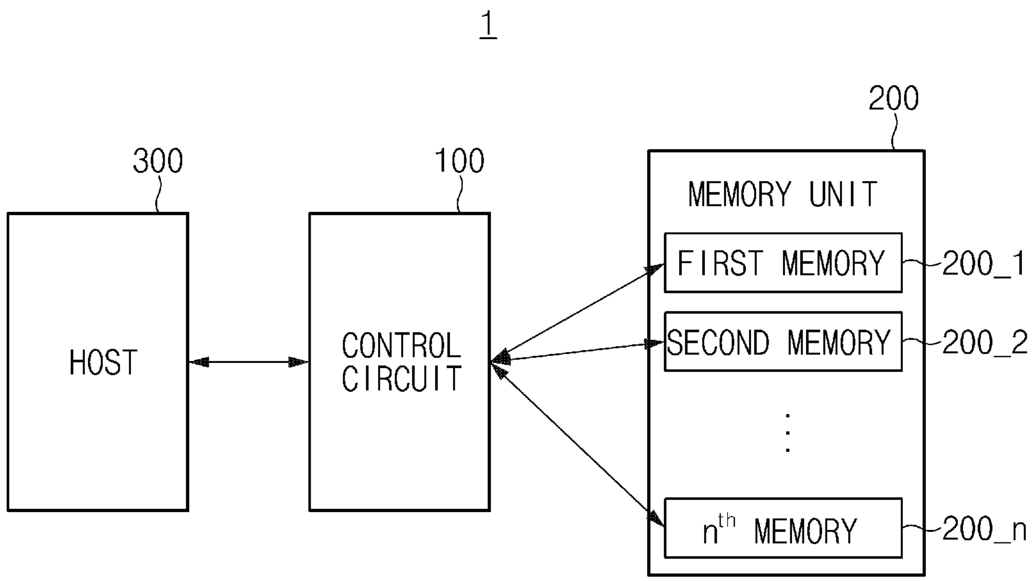
FIG. 1 is a block diagram illustrating a representation of an example of a memory device including a control circuit according to an embodiment.

FIG. 1 is a block diagram illustrating a representation of an example of a memory device including a control circuit according to an embodiment.

Referring to FIG. 1, a memory device 1 may include a control circuit 100, a memory unit 200, and a host 300.

The control circuit 100 may perform a control operation such that operations of the memory unit 200 including a plurality of memory 200_1 to **200_*n* may be associated according to an error correction scheme of the host 300. The control circuit 100 generates an internal command from a command, which has been received from the host 300, on the basis of access units of the plurality of memory 200_1 to 200_*n*. The control circuit 100 may store the access units of the plurality of memory 200_1 to 200_*n*. In an embodiment, a signal may be transmitted or received to or from the host 300 and the plurality of memory 200_1 to 200_*n*** in a protocol format.

The control circuit 100 may include control circuits 100 and 100*a* which will be described with reference to FIG. 2 and FIG. 6.

The memory unit 200 may include the plurality of memory 200_1 to 200_*n*. The plurality of memory 200_1 to 200_*n* may have form factors different from another, respectively. For example, the form factor of the first memory 200_1 may correspond to M1, the form factor of the second memory 200_2 may correspond to M2, and the form factor of the $n^{th}$ memory 200_*n* may correspond to Mn.

Burst lengths of the plurality of memory 200_1 to 200_*n*, which are written or read at a one-time time point, may be different from one another. For example, the burst length of the first memory 200_1 may correspond to BL1, the burst length of the second memory 200_2 may correspond to BL2, and the burst length of the $n^{th}$ memory 200_*n* may correspond to BLn.

A unit in which each memory may be accessed at a one-time time point, that is, an access unit may correspond to a value obtained by multiplying the form factor by the burst length. For example, the access unit C1 of the first memory 200_1 may correspond to M1×BL1, the access unit C2 of the second memory 200_2 may correspond to M2×BL2, and the access unit Cn of the $n^{th}$ memory 200_*n* may correspond to Mn×BLn.

Since access units for the memories 200_1 to 200_*n* may be different from one another, the control circuit 100 needs to manage data, which has been received from the host 300, or data, which has been requested from the host 300, to be written or read according to different operation cycles on the basis of the access units of the memory 200_1 to 200_*n*.

The host 300 may exchange signals with the control circuit 100 in the form of packets. For example, the host 300 and the control circuit 100 may transmit/receive signals through an abstracted protocol.

In the abstracted protocol, signals may be transmitted/received at a non-deterministic timing, and the host 300 may transmit data and commands to the control circuit 100 regardless of the type (or characteristics or access units) of the plurality of memory 200_1 to 200_*n*.

On the basis of data and commands received from the host 300 and the characteristics of various memories 200_1 to 200_*n* of the memory unit 200, the control circuit 100 may process the data and the commands and provide them.

When data is transmitted/received among the host 300, the control circuit 100, and the memory unit 200, an error correction code may be provided in order to ensure the reliability of data.

Data and the size of the error correction code based on the data may be decided according to an error correction scheme or the operation characteristics of a memory. For example, when the host 300 uses an error correction scheme of a SECDED (Single Error Correction Double Error Detection) of 64-8 bits, data of 64 bits and an error correction code of 8 bits may be transmitted in a one-time write command.

The plurality of memory 200_1 to 200_*n* included in the memory unit 200 may operate according to data received from the host 300 and a ratio different from to a preset ratio of the error correction code. Accordingly, in order to associate operations between the host 300 and the memory unit 200 with one another, the control circuit 100 generates an internal command on the basis of an access unit of the memory unit 200.

According to an embodiment, in a write operation, the control circuit 100 may temporarily store an error correction code received from the host 300, and may write only reception data in the memory unit 200 on the basis of an access unit. In a read operation, the control circuit 100 may read data from the memory unit 200 on the basis of the access unit and transmit the data to the host 300 together with the already stored error correction code.

In another embodiment, the control circuit 100 may also write an error correction code in one or more memories selected from the memory unit 200 together with reception data from the host 300. On the basis of the capacity of a memory of the memory unit 200 in which the reception data is written, the error correction code may be written in the memory or stored only in the control circuit 100.

In an embodiment, the control circuit 100 may separately write reception data and an error correction code in the plurality of memory included in the memory unit 200. The error correction code written in the memory may be decided according to the size of the reception data. For example, reception data from the host 300 may be 512 bits and the error correction code may be 64 bits. The control circuit 100 may write 256 bits of the reception data from the host 300 in the first memory 200_1 and write the remaining 256 bits in the second memory 200_2. In this case, when the first memory 200_1 or the second memory 200_2 has an error correction function and a storage space, an error correction code of 32 bits may be written together with the data.

On the basis of error correction code received from the control circuit 100, the memory unit 200 may internally perform a separate error correction operation. In a read operation, the control circuit 100 may read data and the error correction code from the memory unit 200 and transmit the data and the error correction code.

In the case of writing data and/or an error correction code in the memory unit 200 or reading the data and/or the error correction code from the memory unit 200, the control circuit 100 should generate an internal command according to the access units of the memory 200_1 to 200_*n* included in the memory unit 200.

Accordingly, in the case of a write operation, the control circuit 100 may compare the size of data received from the host 300 with the access units of the memories 200_1 to 200_*n* included in the memory unit 200. On the basis of the comparison result, the control circuit 100 may generate an internal command such that the data (together with an error correction code when a memory selectively has an error correction function and an ensured storage space) received from the host 300 is written in one or more memories 200_1 to 200_*n* included in the memory unit 200 during one or more cycles.

When the size of the reception data from the host 300 is larger than the access units of the memories 200_1 to 200_*n*, the control circuit 100 may generate an internal command such that a write operation is performed for one or more of the plurality of memory 200_1 to 200_*n* through a repetitive write operation of a plurality of times.

The operation for comparing the size of the reception data with the access units of the memories 200_1 to 200_*n* may be performed in the control circuit 100. The control circuit 100 compares the access units of one or more of the memories 200_1 to 200_*n* included in the memory unit 200 with the size of the reception data. According to an embodiment, the control circuit 100 may compare the access units of all the memory 200_1 to 200_*n* included in the memory unit 200 with the size of the reception data.

When the size of the reception data from the host 300 is larger than the access units, the control circuit 100 may transfer the data received from the host 300 to the memory unit 200 through a write cycle corresponding to an integer value obtained by rounding up a value obtained by dividing the size of the reception data by the access units.

When the size of the reception data from the host 300 is less than or equal to the access units, the control circuit 100 may transfer the reception data to the memory unit 200 through a one-time write cycle.

In the case of a read operation, the control circuit 100 may receive a command for reading a specific size of data from the host 300. In the present specification, data requested to be read from the memory unit 200 by the host 300 is called 'request data'.

The control circuit 100 compares the size of the request data with the access units of one or more of the memories 200_1 to **200_*n* included in the memory unit 200. When the size of the request data is larger than the access units on the basis of comparison information CPR, the control circuit 100 may generate an internal command for reading read data through a repetitive read cycle of a plurality of times. When the size of the request data is less than or equal to the access units on the basis of comparison information CPR, the control circuit 100** may read data through a one-time write cycle.

According to an embodiment, when the size of the request data is excessively larger than the access units, since the control circuit 100 repeatedly generates an internal command and reads the request data, it may not be efficient in terms of an operation. Accordingly, as a comparison result of the size of the request data and the access units, when a cycle exceeding a preset value is required, the control circuit 100 may transmit a read failure signal indicating that a read operation is not possible to the host 300, thereby allowing the host 300 to request a smaller size of request data.

Similarly to the write operation, also in the read operation, data provided from the host 300 may also include data and an error correction code.

As described above, a command of the read or write operation from the host 300 and the size of data requested for the command may be provided to the control circuit 100 regardless of the access units of the plurality of memory 200_1 to **200_*n***.

On the basis of the access units of the memories 200_1 to **200_*n*, the control circuit 100 may write reception data from the host 300 in the memory unit 200 through one or more cycles or read the request data requested by the host 300 from the memory unit 200**.

In order to associate characteristics, which are provided by the ratio of data and an error correction code specified by the host 300 with the access unit of the memory unit 200, the control circuit 100 may separately manage data and an error correction code. As described above, the control circuit 100 may separately store only the error correction code therein or may write an error correction code corresponding to the data written in the memory unit 200.

According to an embodiment, when the memory 200_1 to **200_*n* included in the memory unit 200 include error correction logics, the memory 200_1 to 200_*n* may also internally perform an on-die ECC (error correction code) operation for performing an error correction operation on the basis of an error correction code provided from the host 300**.

In an embodiment, the control circuit 100 may not only transfer an error correction code between the host 300 and the memory unit 200, but may also directly generate error correction information on request data read from the memory unit 200 by using an error correction circuit included therein and correct an error, or receive error-corrected information from the memory unit 200 and transfer the received information to the host 300.

Figure 2:
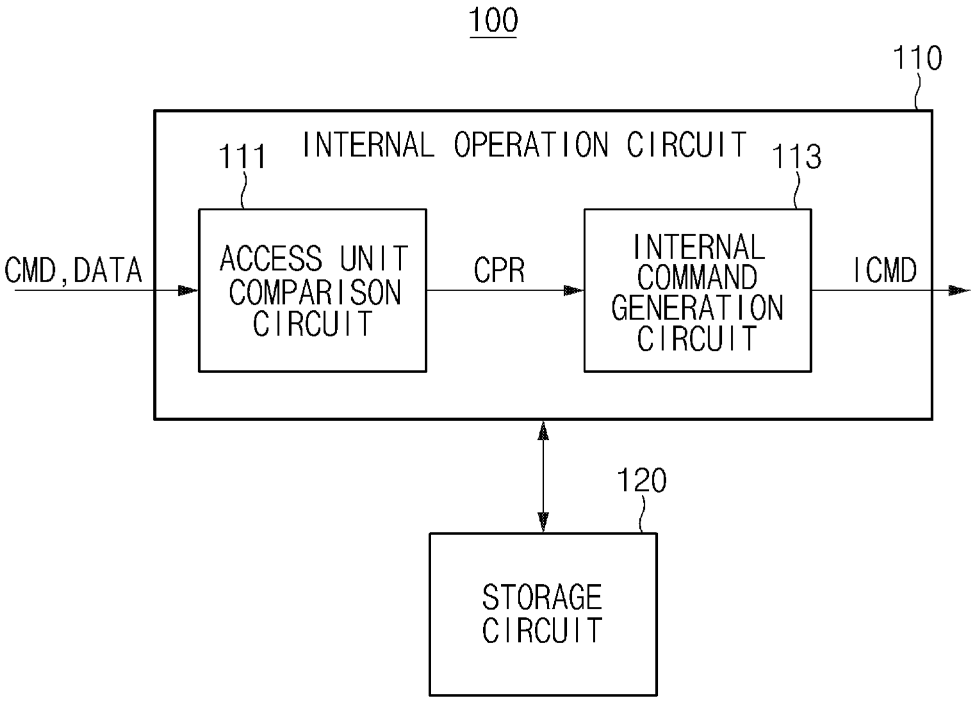
FIG. 2 is a block diagram illustrating a representation of an example of a control circuit according to an embodiment.

FIG. 2 is a block diagram illustrating a representation of an example of a control circuit according to an embodiment.

Referring to FIG. 2, a control circuit 100 may include an internal operation circuit 110 and a storage circuit 120. The internal operation circuit 110 may generate an internal command ICMD on the basis of the access unit (for example, Cn) of the plurality of memory 200_1 to **200_*n* included in the memory unit 200 of FIG. 1**.

The control circuit 100 may include the storage circuit 120 that stores information on the access unit of the plurality of memory 200_1 to **200_*n*. According to an embodiment, when the control circuit 100 stores an error correction code PRT received from the host 300, the storage circuit 120 may store the error correction code PRT and then provide the error correction code PRT together with data in the case of providing an exterior with data corresponding to the error correction code PRT. The storage circuit 120 may also perform a function in which the control circuit 100** temporarily stores data.

The internal operation circuit 110 may include an access unit comparison circuit 111 and an internal command generation circuit 113.

The access unit comparison circuit 111 compares the size of reception data from the host 300 with the access unit of the memories 200_1 to **200_*n* in the case of a write operation, and compares the size of request data from the host 300, for example, the size of data commanded to be read from the memory unit 200 by the host 300**, with the access unit and generates comparison information CPR.

The comparison information CPR may include a value obtained by dividing the size of the reception data from the host 300 or the size of the request data from the host 300 by the access unit. For example, the comparison information CPR may include a value obtained by dividing the size of the reception data or the request data by the access unit and rounding up the numerals after the decimal point.

When the size of the reception data or the size of the request data is larger than the access unit, the comparison information CPR may correspond to a value exceeding 1 or an integer value equal to or more than 2.

When the size of the data received from the host 300 or the size of the data requested to be read by the host 300 is less than or equal to the access unit, the comparison information CPR may correspond to a value less than or equal to 1.

According to an embodiment, the access unit comparison circuit 111 may compare the reception data or the request data with the access units of all the memory 200_1 to **200_*n* included in the memory unit 200, and may the generate the comparison information CPR. In an embodiment, when an access unit of a preset number of memories is larger than the reception data or the request data, the access unit comparison circuit 111** may stop a comparison operation.

The internal command generation circuit 113 generates an internal command ICMD on the basis of the comparison information CPR received from the access unit comparison circuit 111. The internal command generation circuit 113 may generate the internal command ICMD for performing a write operation or a read operation through one or more cycles on the basis of the comparison information CPR.

For example, when the size of data received from the host 300 is larger than the access unit of the memories 200_1 to **200_*n* included in the memory unit 200, the internal command generation circuit 113** may generate the internal command ICMD such that a write operation is performed through a repetitive operation of a plurality of times.

The access unit for the memories 200_1 to **200_*n* has been decided, but the host 300 may transmit a write command regardless of the access unit of the memories 200_1 to 200_*n*. Accordingly, the internal command generation circuit 113 included in the control circuit 100 generates the internal command ICMD such that data is written according to the access unit of the memories 200_1 to 200_*n***.

Furthermore, in order to match a ratio of data, which is transmitted from the host 300 or should be provided to the host 300, and an error correction code based on the data, when only data is written in the memory unit 200 and an error correction code is separately managed by the control circuit 100 or data is written in the memory unit 200 during several cycles and a memory with written data of the memory unit 200 has an error correction logic, the control circuit 100 may write an error correction code by different values according to the written data.

In an operation in which data is written in the memory unit 200 through the control circuit 100, even though data is written during cycles of a plurality of times, data may be written only in one memory selected in the memory unit 200 or data may be separately written in several memories.

A command CMD provided from the host 300 may include information for allowing data to be written only in a specific memory of the memory unit 200 or information for allowing data to be distributed and written in several memories.

Furthermore, according to an embodiment, data may be written in the memory unit 200 according to a scheme set in the control circuit 100. For example, the control circuit 100 includes information on the access unit and the like of the memories 200_1 to **200_*n* included in the memory unit 200**, wherein the information may allow data to be firstly written in a memory having a large access unit, data to be firstly written in a physically adjacent memory, or data to be preferentially written according to a preset priority. Furthermore, an operation, in which data is written only in one memory or data is distributed and written in several memories, may also be performed in different schemes according to an embodiment.

Figure 3:
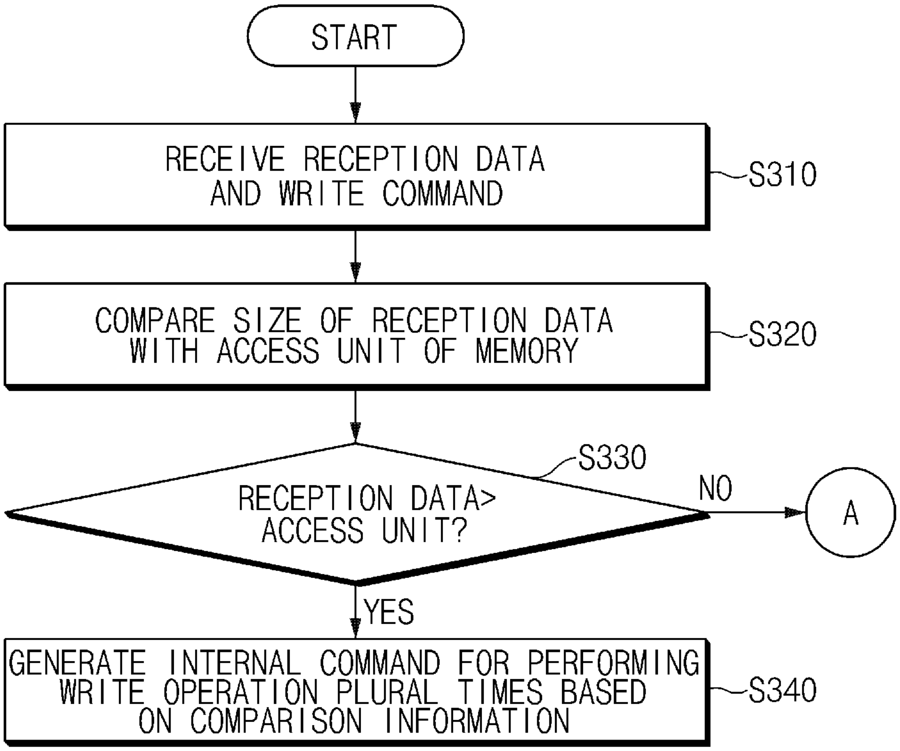
FIG. 3 is a flowchart for explaining a representation of an example of a write operation of a control circuit according to an embodiment.

FIG. 3 is a flowchart for explaining a representation of an example of the write operation of the control circuit according to an embodiment.

Referring to FIGS. 1 to 3, the control circuit 100 may receive reception data, an error correction code, and a write command from the host 300 (step S310). The host 300 may provide the reception data and the error correction code with a size having a predetermined ratio. Furthermore, the write command may include an address specified by the host 300. The control circuit 100 may map the address included in the command with an address of the memory unit 200 and store the mapped address.

The control circuit 100 compares the size of the reception data with the access units of the plurality of memory 200_1 to **200_*n* constituting the memory unit 200 (step S320). According to an embodiment, the control circuit 100 may compare the access units of all the plurality of memory 200_1 to 200_*n* with the size of the reception data or access units of some of the plurality of memory 200_1 to 200_*n*** with the size of the reception data.

When the size of the reception data is larger than the access units (Yes of step S330), the control circuit 100 may generate an internal command for performing a write operation a plurality of times (step S340). The case in which the size of the reception data is less than or equal to the access units (No of step S330) will be described with reference to FIG. 4.

As described with reference to FIG. 1 and FIG. 2, the access unit comparison circuit 111 included in the control circuit 100 may round up a value obtained by dividing the reception data by the access unit or a divided value, and provide the comparison information CPR.

Accordingly, when the size of the reception data is larger than the access units, the comparison information CPR may be a number larger than 1 or an integer larger than 2. The internal command generation circuit 113 may generate an internal command for performing a write operation, which is repeated by an integer included in the comparison information CPR, on the basis of the access units of the memories 200_1 to **200_*n* included in the memory unit 200. Furthermore, the internal command generation circuit 113 may also divide the reception data according to the access units, load the data on the internal command, and transmit the internal command to the memory unit 200**.

For example, when the size of the reception data is N bits and the access units of the plurality of memory 200_1 to **200_*n* included in the memory unit 200 respectively correspond to C1 to Cn, the comparison information CPR may correspond to a value obtained by dividing N by one or more of C1 to Cn and may be realized such that the N bits includes a combination (for example, N=C1+C2+C3, N=C1+Cn, and the like) of C1** to Cn as a whole.

The internal command generation circuit 113 may divide the reception data according to the access units, load the data on an internal command of a plurality of times, and transmit the internal command to the memory 200_1 to **200_*n* included in the memory unit 200**.

In an embodiment, the internal command generation circuit 113 may write an error correction code in the memory unit 200 as well as the reception data. When a memory with written data includes an error correction logic, the internal command generation circuit 113 may transmit an error correction code corresponding to the data written in the memory to the memory. When the memory with the written data includes no error correction logic, the error correction code may be stored in the storage circuit 120 provided in the control circuit 100.

Figure 4:
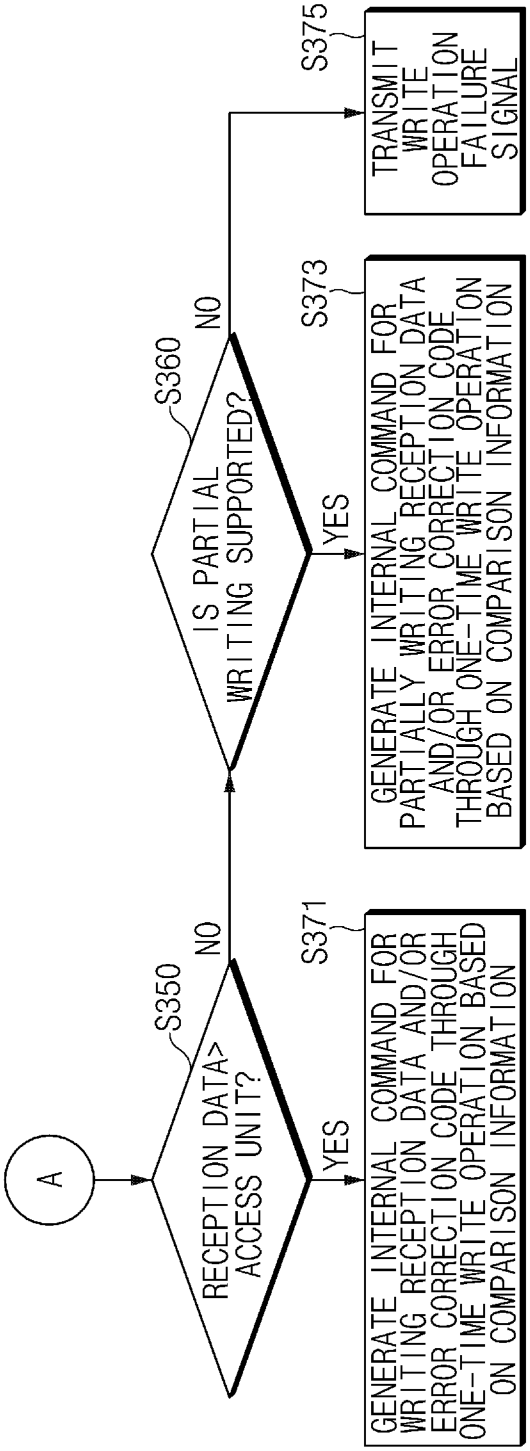
FIG. 4 is a flowchart for explaining the case in which the size of reception data is less than or equal to an access unit in a write operation according to an embodiment.

The case in which the size of the reception data is less than or equal to the access units will be described with reference to FIG. 4. FIG. 4 is a flowchart for explaining the case in which the size of the reception data is less than or equal to the access units in the write operation according to an embodiment.

Referring to FIG. 4, the access unit comparison circuit 111 determines whether the size of the reception data is equal to the access units (step S350). When the size of the reception data is equal to the access units (Yes of step S350), the access unit comparison circuit 111 may provide the internal command generation circuit 113 with the comparison information CPR indicating that the size of reception data is equal to the access units.

The internal command generation circuit 113 may generate a write command capable of writing the reception data in the memory unit 200 through a one-time write operation (step S371). According to an embodiment, the reception data and an error correction code may also be written in the memory unit 200 at a time.

When the size of the reception data is not equal to the access units (No of step S350), the reception data may be less than the access units. In such a case, some reception data of the access units may be written only when the memories 200_1 to **200_*n* included in the memory unit 200** should support partial writing.

Whether the memory 200_1 to **200_*n* included in the memory unit 200 support the partial writing may be determined on the basis of information stored in the storage circuit 120. Some memories included in the memory unit 200 support the partial writing (Yes of step S360), the internal command generation circuit 113 may generate an internal command for partially writing the reception data and/or an error correction code in a memory supporting the partial writing through a one-time write operation (step S373**).

When any memories included in the memory unit 200 do not support the partial writing (No of step S360), since the reception data may not be written in the memory unit 200, the access unit comparison circuit 111 may transmit a write operation failure signal to the host 300 (step S375).

Figure 5:
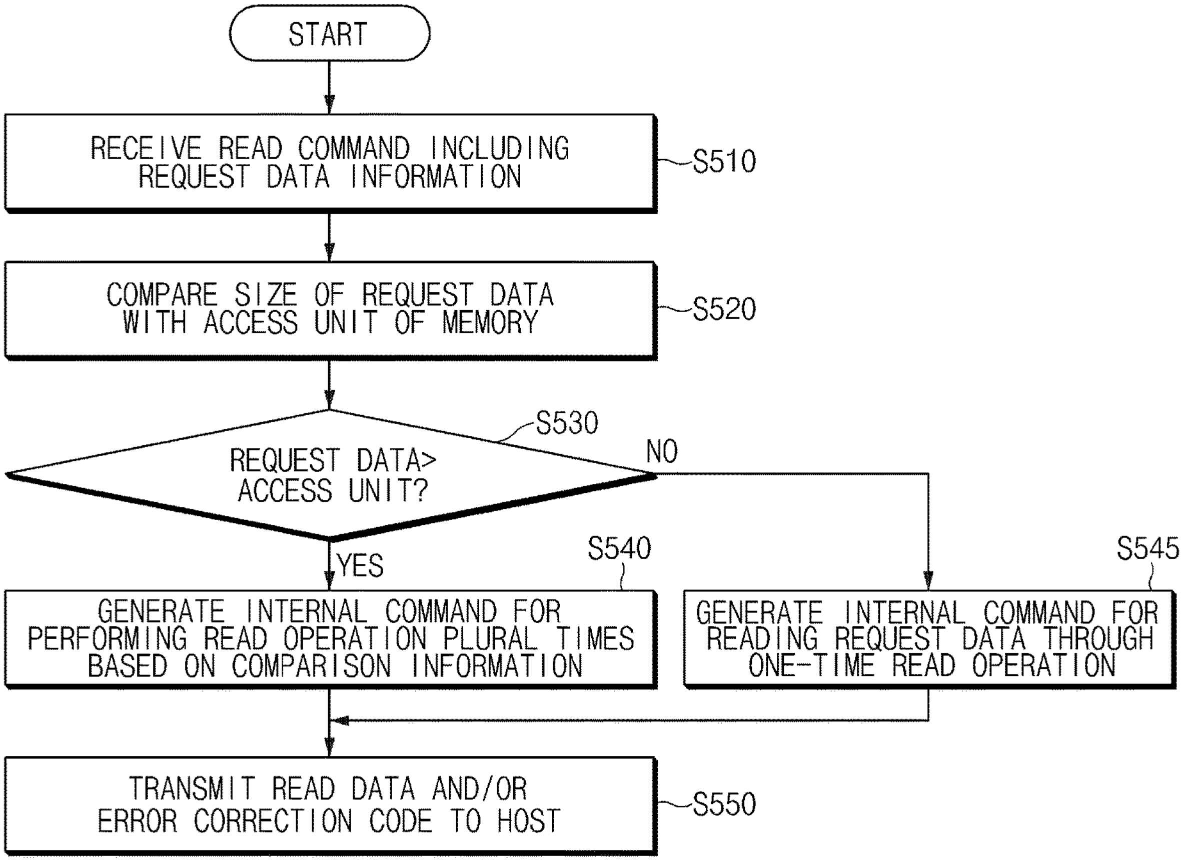
FIG. 5 is a flowchart for explaining a representation of an example of a read operation of a control circuit according to an embodiment.

FIG. 5 is a flowchart for explaining a representation of an example of the read operation of the control circuit according to an embodiment.

Referring to FIGS. 1, 2, and 5, the control circuit 100 receives a read command including request data information from the host 300 (step S510). The request data information may include the size of request data and an address of the request data.

The access unit comparison circuit 111 compares the size of the request data with the access units (step S520). When the size of the request data is larger than the access units (Yes of step S530), it is not possible to read request data written in a memory through a one-time read operation. Accordingly, the request data should be read a plurality of times.

The access unit comparison circuit 111 provides comparison information CPR to the internal command generation circuit 113. On the basis of the comparison information CPR, the internal command generation circuit 113 generates an internal command for performing a read operation a plurality of times (step S540). According to an embodiment, the internal command generation circuit 113 may map an address provided from the host 300 into an address written in the memory unit 200, generate address information again, and put the address information into an internal command ICMD.

The control circuit 100 may read the request data a plurality of times according to the generated internal command and transmit the read data to the host 300. According to an embodiment, an error correction operation may be performed in the memory unit 200 and data may be provided to the control circuit 100, or an error correction code stored in the control circuit 100 may be transmitted to the host 300 together with the read data.

When the size of the request data is less than or equal to the access units (No of step S530), the access unit comparison circuit 111 provides the internal command generation circuit 113 with comparison information CPR indicating that the size of the request data is less than or equal to the access units.

When the size of the request data is less than the access units, the request data may be sufficiently read through a one-time read operation. Accordingly, the internal command generation circuit 113 generates an internal command ICMD for reading the request data through a one-time read operation (step S545).

Similarly, the control circuit 100 may transmit the data read through the internal command to the host 300, and may selectively provide an error correction code to the host 300 (step S550).

According to an embodiment, on the basis of the request data information included in the read command received from the host 300, the control circuit 100 may determine the case in which reading of the request data within a preset time is not possible and transmit a failure signal to the host 300. The preset time may be set in the control circuit 100 in advance or may be included in the read command provided to the control circuit 100 from the host 300.

Figure 6:
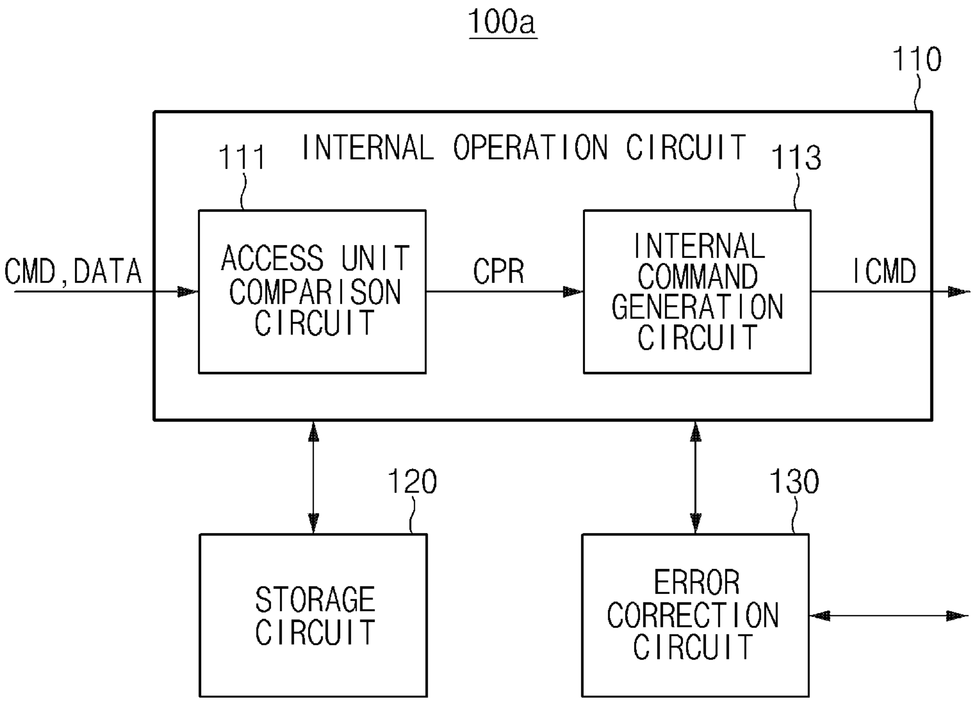
FIG. 6 is a block diagram illustrating a representation of an example of a control circuit according to an embodiment.

FIG. 6 is a block diagram illustrating a representation of an example of a control circuit according to an embodiment.

Referring to FIG. 6, a control circuit **100*a* (i.e., see FIG. 2) may further include an error correction circuit 130. The error correction circuit 130 may generate error correction information with respect to data read from the memory unit 200 (i.e., see FIG. 1). For example, in a read operation, the error correction circuit 130 may generate the error correction information with respect to the request data read from the memory unit 200, or when an error correction command is provided from the host 300, the error correction circuit 130 may read data from the memory unit 200 to correct an error and write error-corrected data in the memory unit 200** again.

The control circuit **100*a* may further include the error correction circuit 130, thereby performing an error correction function separately from the host 300 and the memory unit 200**.

In the control circuit according to an embodiment and the memory device including the same, in order to execute a command provided from the host without considering the characteristics of a plurality of memory, it may be possible to generate an appropriate internal command according to access units of the plurality of memory. Consequently, it may be possible to associate operations between the plurality of memory and the host with each other, and in order to associate an error correction code, which should be provided from the host while having a predetermined ratio, with operations among the plurality of memory, the error correction code is separately managed.

While various embodiments have been described above, it will be understood to those skilled in the art that the embodiments described are by way of example only. Accordingly, the control circuit and the memory device including the same described herein should not be limited based on the described embodiments.

What is claimed is:

1. A control circuit, comprising:

an internal operation circuit configured to generate an internal command based on an access unit of a memory in a plurality of memories; and a storage circuit configured to store information regarding the access unit, wherein the access unit includes a burst length which is different from another access unit, wherein the control circuit associates the memory with an error correction scheme of a host, wherein the access unit indicates a size of data accessed by the memory at a time, and wherein the internal operation circuit transmits a failure signal to the host when request data requested from the host is not acquired within a preset time.

2. The control circuit of claim 1, wherein the internal operation circuit comprises:

an access unit comparison circuit configured to compare a size of data received from the host with the access unit of the memory; and an internal command generation circuit configured to generate the internal command on a basis of comparison information.

3. The control circuit of claim 1, wherein the internal operation circuit comprises:

an access unit comparison circuit configured to compare a size of request data received from the host with the access unit of the memory; and an internal command generation circuit configured to generate the internal command on a basis of comparison information.

4. The control circuit of claim 2, wherein when the size of the received data is larger than the access unit based on the comparison information, the internal command generation circuit generates the internal command for performing a write operation with respect to one or more of the plurality of memories through a repetitive write operation of a plurality of times.

5. The control circuit of claim 2, wherein when the size of the data received from the host is less than or equal to the access unit based on the comparison information, the internal command generation circuit generates the internal command for performing a one-time write operation with respect to one or more of the plurality of memories.

6. The control circuit of claim 1, wherein the storage circuit stores error correction information on the data received from the host.

7. The control circuit of claim 3, wherein when the size of the request data is larger than the access unit on the basis of the comparison information, the internal command generation circuit generates the internal command for performing a read operation from one or more of the plurality of memories through a repetitive read cycle of a plurality of times.

8. The control circuit of claim 3, wherein when the size of the data received from the host is less than or equal to the access unit on the basis of the comparison information, the internal command generation circuit generates the internal command for performing a one-time read operation.

9. The control circuit of claim 1, wherein the failure signal includes a repetitive data pattern, and wherein the preset time corresponds to a predetermined number of requests.

10. The control circuit of claim 1, further comprising:

an error correction circuit configured to generate error correction information on data read from one or more of the plurality of memories.

11. The control circuit of claim 10, wherein the error correction circuit generates the error correction information on the data read from one or more of the plurality of memories.

12. The control circuit of claim 10, wherein the error correction circuit performs error correction on the data read from one or more of the plurality of memories on a basis of a command from the host and performs an operation for writing the data in one or more of the plurality of memories again.

13. The control circuit of claim 1, wherein a signal is transmitted/received to/from the host and one or more of the plurality of memories in a protocol format.

14. A memory device comprising:

a control circuit configured to generate an internal command from a received command on a basis of data of a host, a unit of an error correction code, and an access unit of one or more of a plurality of memories in order to associate an error correction scheme of the host; and the one or more of the plurality of memories configured to operate based on the internal command received from the control circuit, wherein the access unit indicates a size of data accessed by the one or more of the plurality of memories at a time, wherein the control circuit comprises:

an access unit comparison circuit configured to compare a size of data received from the host with the access unit of one or more of the memories for a write operation, and compare a size of request data received from the host with the access unit of one or more of the memories to generate comparison information in a read operation; and an internal command generation circuit configured to generate the internal command on a basis of the comparison information, and wherein the internal command generation circuit transmits a failure signal to the host when the request data requested from the host is not acquired within a preset time.

15. The memory device of claim 14, wherein the host generates the received command and operates according to a preset error correction scheme.

16. The memory device of claim 14, wherein one or more of the plurality of memories include an error correction logic.

17. The memory device of claim 14, wherein the failure signal includes a repetitive data pattern, and wherein the preset time corresponds to a predetermined number of requests.

18. The memory device of claim 14, wherein the control circuit generates the internal command for writing the data and the error correction code through one or more number of times on a basis of a result obtained by comparing the access unit with the size of the received data.

19. The memory device of claim 16, wherein, when the received command instructs a read operation, the control circuit reads request data and the error correction code from one or more of the plurality of memories and transmits the request data and the error correction code to the host.

20. The memory device of claim 19, wherein the control circuit generates the internal command for reading the data and the error correction code through one or more number of times on a basis of a result obtained by comparing the access unit with a size of the request data.

21. The memory device of claim 14, wherein the host requests a smaller size of request data in response to the failure signal.

* * * * *